(12) United States Patent
Ewan

(10) Patent No.: US 7,819,262 B1
(45) Date of Patent: Oct. 26, 2010

(54) APPARATUS FOR COVERING SEMITRAILER PAYLOADS

(76) Inventor: Carl R. Ewan, P.O. Box 994, Three Forks, MT (US) 59752

( * ) Notice: Subject to any disclaimer, the term of this patent is extended or adjusted under 35 U.S.C. 154(b) by 0 days.

(21) Appl. No.: 12/322,920

(22) Filed: Feb. 9, 2009

Related U.S. Application Data

(60) Provisional application No. 61/063,961, filed on Feb. 7, 2008.

(51) Int. Cl.
  *B60P 7/04* (2006.01)
(52) U.S. Cl. .................. 212/325; 212/326; 296/100.01; 296/100.11
(58) Field of Classification Search .................. 212/325, 212/326; 296/100.01, 100
  See application file for complete search history.

(56) References Cited

U.S. PATENT DOCUMENTS

| | | | |
|---|---|---|---|
| 402,524 A * | 4/1889 | Helvey | 212/285 |
| 2,061,044 A * | 11/1936 | Ringe | 212/331 |
| 5,964,236 A | 10/1999 | Berke | |
| 6,273,401 B1 | 8/2001 | Payne | |
| 6,502,709 B1 | 1/2003 | Parker | |
| 6,811,202 B2 | 11/2004 | Hornady | |
| 6,857,620 B2 | 2/2005 | Payne | |
| 7,032,950 B2 * | 4/2006 | Eggers et al. | 296/98 |
| 7,314,244 B2 | 1/2008 | Hartman et al. | |
| 7,377,572 B2 | 5/2008 | Hartman et al. | |
| 2002/0043816 A1 | 4/2002 | Johnson | |
| 2006/0043755 A1 | 3/2006 | Coughtry | |
| 2008/0129074 A1 | 6/2008 | Hartman et al. | |

FOREIGN PATENT DOCUMENTS

JP    7-144573 A   *  6/1995
SU       743932 B  *  7/1980

* cited by examiner

*Primary Examiner*—Thomas J Brahan

(57) ABSTRACT

Apparatus for covering a payload of a semitrailer with a tarpaulin cover having an overhead structure including a first travel beam and a second travel beam. A carriage is movable on the first travel beam and second travel beam from a position where the carriage rests over the payload to be covered to a position spaced apart in a side-by-side relation with the payload to be covered. A rotatable drum upon which a cable is wound is mounted to the carriage and the connector is used for connecting a free end of the cable to the tarpaulin. An electric system or hydraulic system is used for selectively locating the rotatable drum in opposite directions.

10 Claims, 12 Drawing Sheets

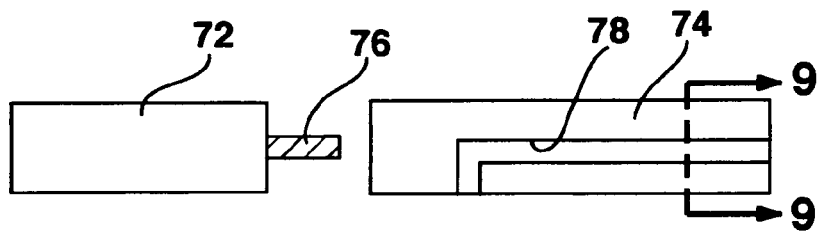
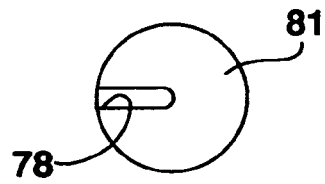 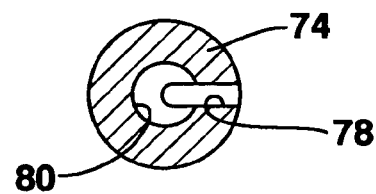
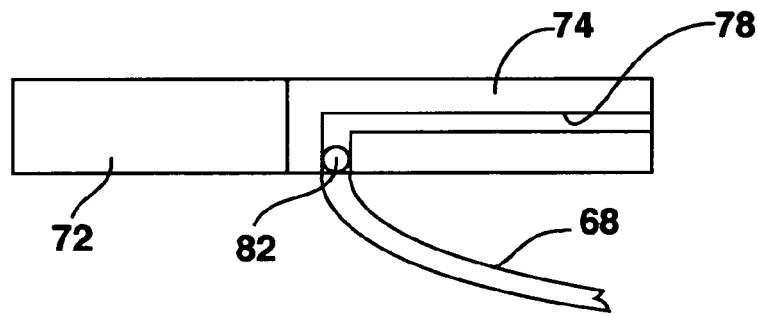
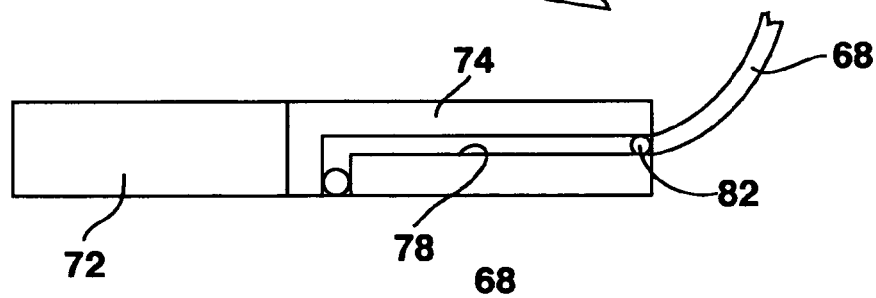
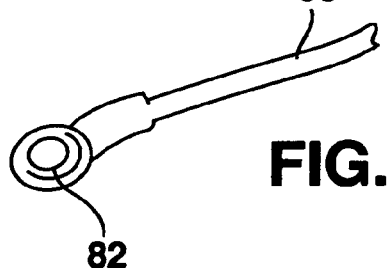

US 7,819,262 B1

APPARATUS FOR COVERING SEMITRAILER PAYLOADS

This application claims the benefit of provisional application Ser. No. 61/063,961 filed Feb. 7, 2008.

BACKGROUND OF INVENTION

The present invention relates to apparatus for covering a semitrailer payload with a tarpaulin. When materials or commodities are hauled on flatbed trailers or semitrailers, many such materials or commodities must be covered with a tarpaulin to protect the goods from inclement weather. Various types of coverings are used to cover these payloads, the most common of which is tarpaulin. However, covering payloads on a flatbed trailer present several problems. If the tarpaulin is to be manually placed on top of the payload and the tarpaulin secured to the semitrailer, the workers must climb to the top of the payload with the tarpaulin and then position the tarpaulin over the payload and then tie down the tarpaulin to the semitrailer. These may require several workers working together. Therefore the process is time consuming and inefficient. Further, workers working on top of a payload are working at a height which may present dangers of the worker falling off the payload.

There are several known apparatus used for covering semitrailer payloads. For example, U.S. Pat. No. 6,502,709 shows an apparatus for pulling a tarpaulin up and over a payload; U.S. Pat. No. 6,811,202 to Hornady shows another apparatus for pulling a tarpaulin up and over a payload; and U.S. Pat. No. 6,857,620 shows apparatus for lifting a tarpaulin over a payload using fastening roller members for securing the tarpaulin cover to an arm which is lifted over the payload to be covered.

There is a need for an apparatus which is easy to use, can be operated by a single individual from ground level. A need also exists for apparatus which can be used to lift a tarpaulin completely to an overhead position and to drop the tarpaulin down on top of the payload whereby the tarpaulin can be secured to the semitrailer easily and efficiently. A need also exists for apparatus which can be used to cover payloads requiring multiple tarpaulins not requiring the flatbed or semitrailer to be driven in and then out of the apparatus for placement of the tarpaulins one at a time.

SUMMARY OF INVENTION

The apparatus according to the present invention includes an overhead track structure including a first pair of upright posts spaced apart from one another in a lateral direction with respect to the position of the semitrailer payload being covered and a second pair of upright posts spaced apart from one another in a lateral direction with respect to the position of the semitrailer payload being covered. The second pair of upright posts arranged in spaced apart and parallel relation with the first pair of upright posts in a longitudinal direction with respect to the position of the semitrailer being covered. A first travel beam extends across and is secured to the top of each of the first pair of upright posts and a second travel beam extends across and is secured to the top of each of the second pair of upright posts. The first travel beam and second travel beam each have an outrigger portion extending outwardly from their respective upright posts in the same direction. A carriage is provided which has end beams provided with trolleys for riding on the first and second travel beams. The carriage which is carried by the trollies is movable from a position where the carriage rests on the first and second travel beams between the first pair of upright posts and the second pair of upright posts to a position where the carriage rests on the outrigger portions of the first and second travel beams. A series of rotatable cable drums are mounted to the carriage upon which a cable is wound. A connector is used for connecting a free end of the cable to the tarpaulin. A bi-directional motor is connected to a power source and a controller is electrically connected to the bi-directional motor for running the motor in either direction. Drive shafts connect the motor with each of the cable drums for rotating the cable drums to either drop the cables downwardly for attaching to the tarpaulin and then rotating the drums in the opposite direction whereby the cables lift the tarpaulin to an overhead position. Once the tarpaulin is picked up, and a truck driven adjacent to the tarpaulin, the tarpaulin is moved by the carriage over the top of the payload and the motor used to rotate the cable drums to drop the tarpaulin on top of the payload. The payload may then be secured to the semitrailers.

BRIEF DESCRIPTION OF THE DRAWINGS

In order that the invention may be clearly understood and readily carried into effect, a preferred embodiment of the invention will now be described, by way of example only, with reference to the accompanying drawings wherein:

FIG. 7 is an exploded elevational view of the tarp connector shown in FIG. 6.

FIG. 8 is a right side end view of the tarp connector shown in FIG. 7;

FIG. 9 is a cross-sectional view taken along the line 9-9 in FIG. 8;

FIG. 10 is an elevational view of the tarp connector shown in FIG. 6 with a cable lifting positioned for lifting a tarpaulin;

FIG. 11 is an elevational view of the tarp connector shown in FIG. 10 with a lifting cable positioned for connecting the tarp connector to a tarpaulin;

FIG. 12 is a detail perspective view of a lifting cable used with the present invention;

DESCRIPTION OF PREFERRED EMBODIMENT

Figure 1:
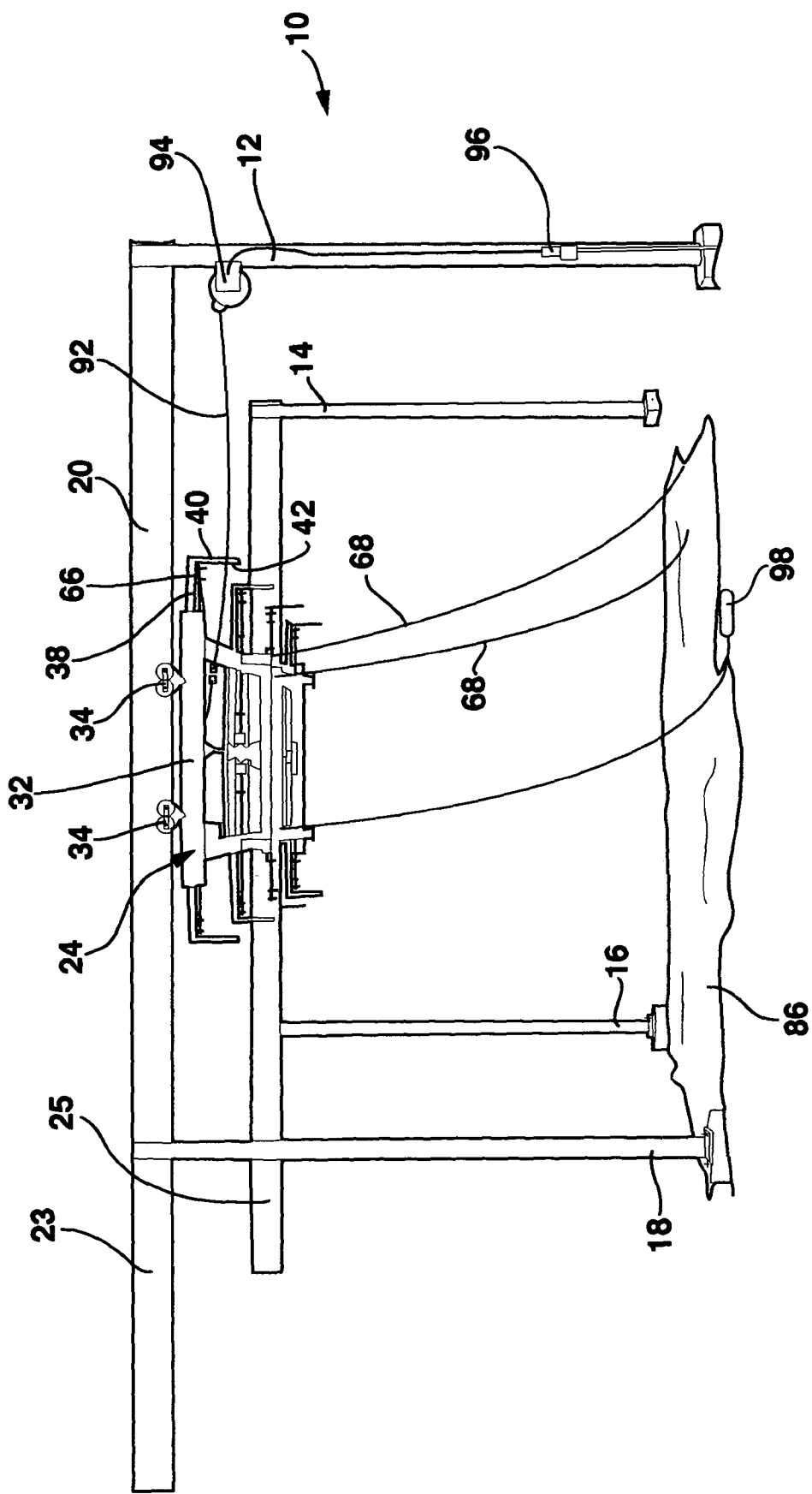
FIG. 1 is a perspective elevational view of an apparatus according to the present invention.
Figure 2:
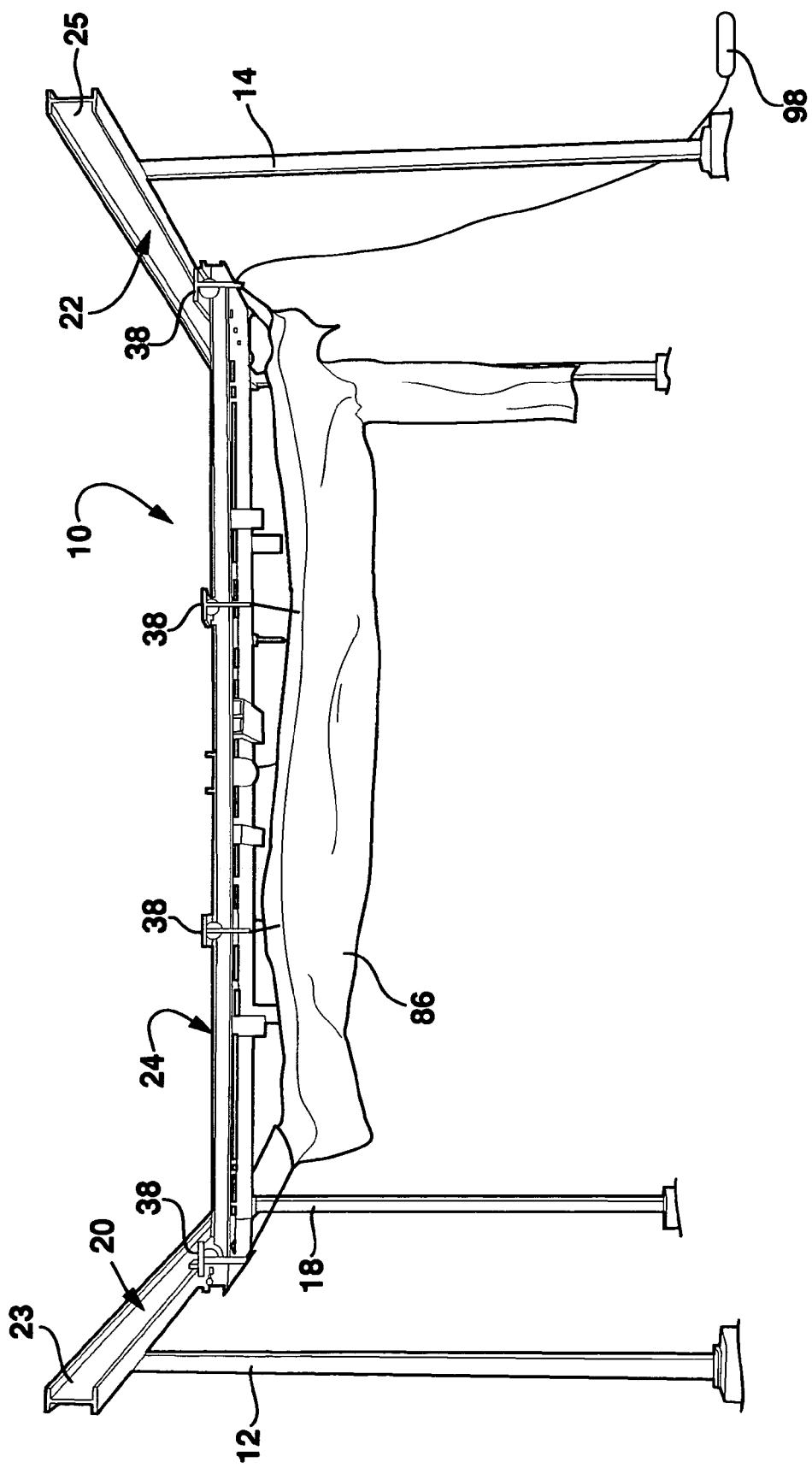
FIG. 2 is left side perspective view of the apparatus shown in FIG. 1.

A tarp lifter 10 according to the present invention is shown in FIGS. 1 and 2. The tarp lifter 10 includes four upright posts 12, 14, 16 and 18.

A travel "I" beam 20 has one end mounted to an upper end of post 4. The travel beam 20 is also mounted to an upper end of the post 16 leaving an outrigger portion 23. Similarly a travel "I" beam 22 has one end mounted to an upper end of post 12. The travel beam 22 is also mounted to an upper end of post 18 leaving an outrigger portion 25.

Figure 3:
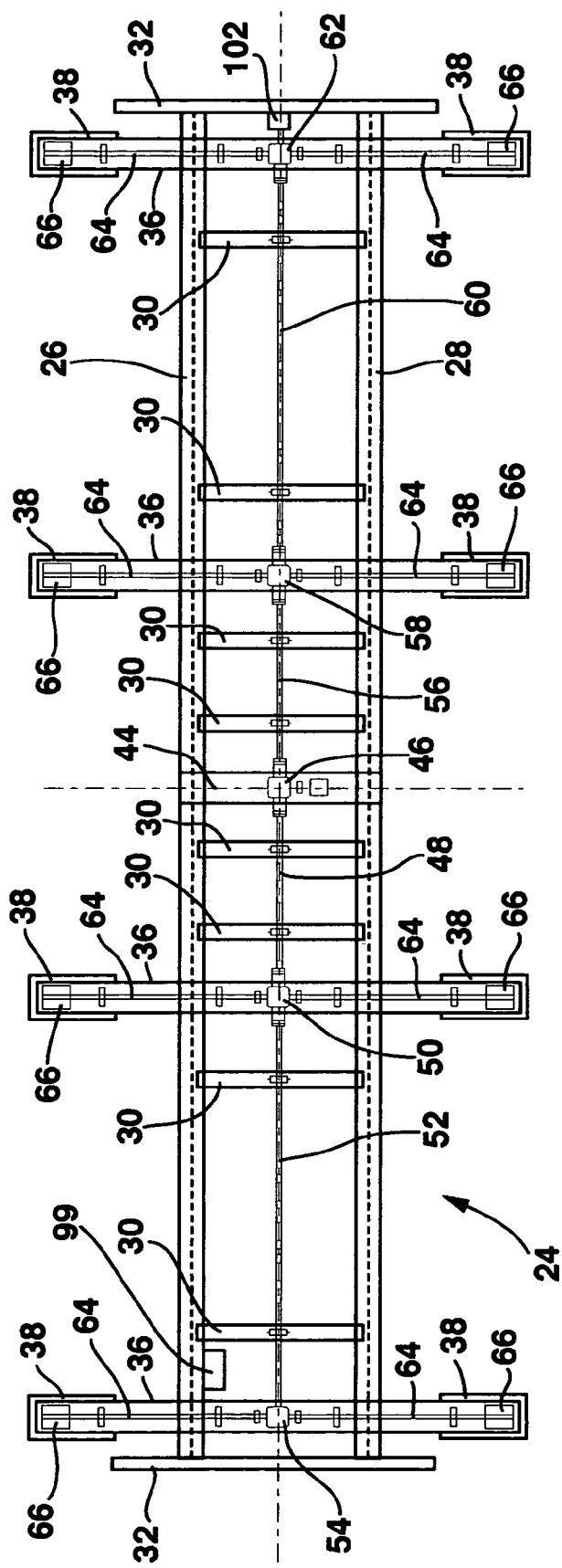
FIG. 3 is a schematic bottom view of a carriage used with the present invention.

A carriage 24 is carried by travel beams 20 and 22 as shown in FIG. 1. The carriage 24, shown in detail in FIG. 3, includes a frame having spaced apart and parallel side beams 26 and 28 and a plurality of brace beams 30 secured to beams 26 and 28. A pair of end beams 32 are mounted at the opposite ends of frame side beams 26 and 28 as shown in FIG. 3. A pair of trolleys 34 are mounted to each of the end beams 32 as shown in FIG. 3. The trolleys are mounted to ride on the respective flanges of the travel beams 20 and 22 as shown in FIGS. 1 and 2. The carriage 24 is thus enabled to ride back and forth on the travel beams 20 and 22.

Figure 4:
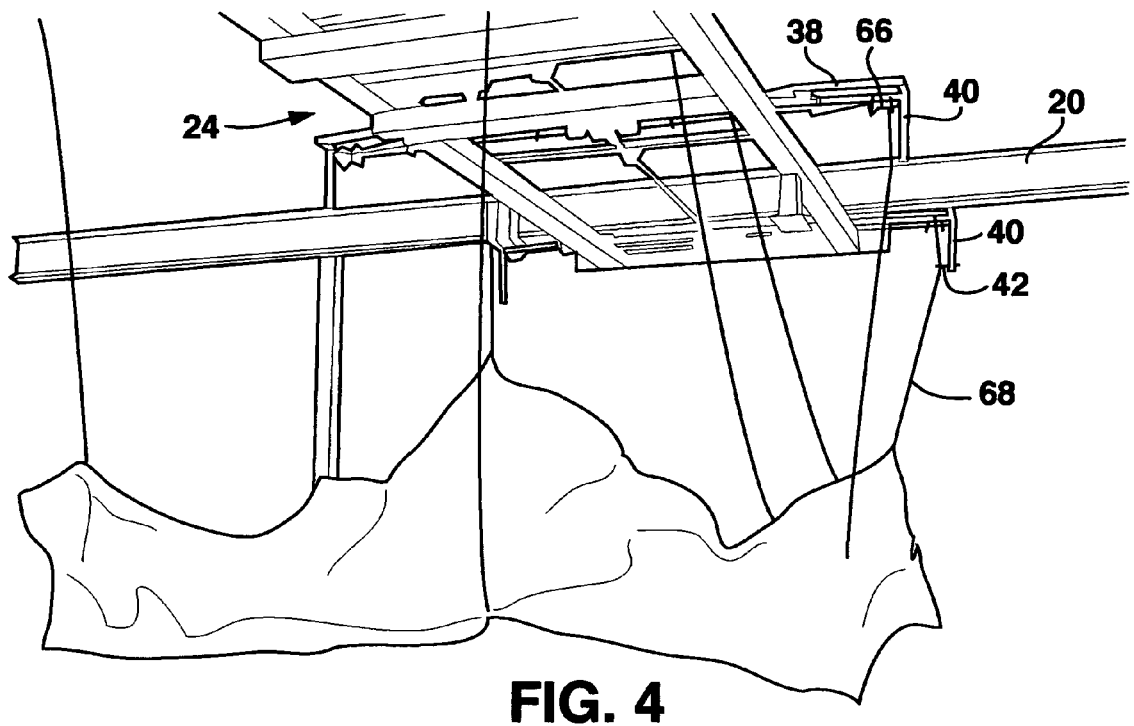
FIG. 4 is a detail bottom perspective view of the carriage shown in FIG. 3.
Figure 5:
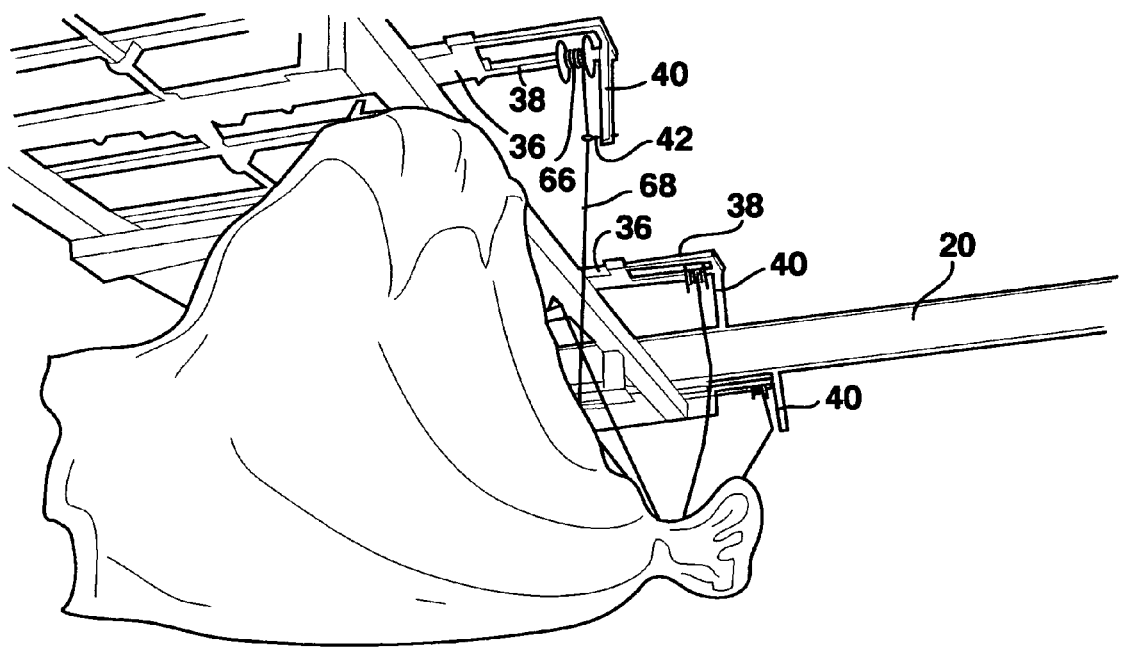
FIG. 5 is a second detail bottom perspective view of the carriage shown in FIG. 3.

Four support beams 36 extend laterally across the frame side beams 26 and 28 as shown in FIG. 3. At each end of the support beams 36 is mounted an extended frame member 38 as shown in FIG. 3 and FIG. 4. A depending supporting member 40 is mounted to each extended frame member 38 as shown in FIGS. 1 and 4. At the distal end of the depending support member 40 is provided a guide ring 42 which acts as a cable guide as explained below.

A motor mount member 44 has opposite ends secured to frame side beams 26 and 28 as shown in FIG. 3. A double output motor with worm drive gear 46 is mounted on the member 44. A first drive shaft 48 is connected to the motor 46 and has an opposite end connected to a four shaft outbox gearbox 50. A second drive shaft 52 is connected to the gearbox 50 and has an opposite end connected to a four shaft output gearbox 54. A third driveshaft 56 has one end connected to the motor 46 and an opposite end connected to a four shaft output gearbox 58. A fourth drive shaft 60 has one end connected to the gearbox 58 and an opposite end connected to a four shaft gear box 62.

Each of the gearboxes 50, 54, 58 and 62 have laterally extending drive shafts 64 connected to a respective gearbox as shown in FIG. 3. The free end of each of the drive shafts 64 is connected to a wind up cable drum 66.

A cable 68 has one end connected to the cable drum 66 and when the motor 46 is activated, the cable 68 can either be wound up on cable drum 66 or unwound from cable drum 66. The opposite end of cable 68 is first threaded through guide ring 42 and then connected to a tarp connector 70 as shown in FIGS. 6 through 11. Although a specific tarp connector 70 is shown and described and is used in a preferred embodiment, other well known tarp connectors such as hooks or rings could be used equally as well.

The tarp connector 70 is a two piece unit having a first cylindrical part 72 and a second cylindrical part 74. The part 72 has a threaded extension 76 which is threadably received by part 74 to form a unit 70 as shown in FIG. 10. The part 74 has a "L" shaped slot 78 which extends into a cylindrical bore 80 as shown in FIG. 9. The bore 80 extends to but not through the end wall 81 of part 72 as shown in FIG. 8.

The cable 68 has a single shank ball 82 mounted to a free end of cable 68 as shown in FIG. 12. The single shank ball 82 is sized to be slidably received by bore 80 but sized larger than the slot 78 so that when the single shank ball 82 is mounted in part 74, the cable 68 is slidably secured to the tarp connector 70.

Figure 6:
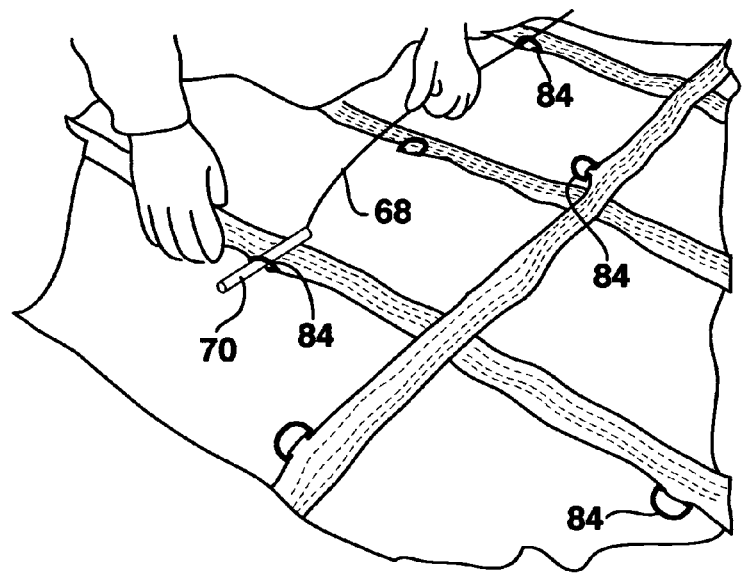
FIG. 6 is a detail perspective view of a tarp connector used with the present invention for mounting to a tarpaulin.
Figure 6A:
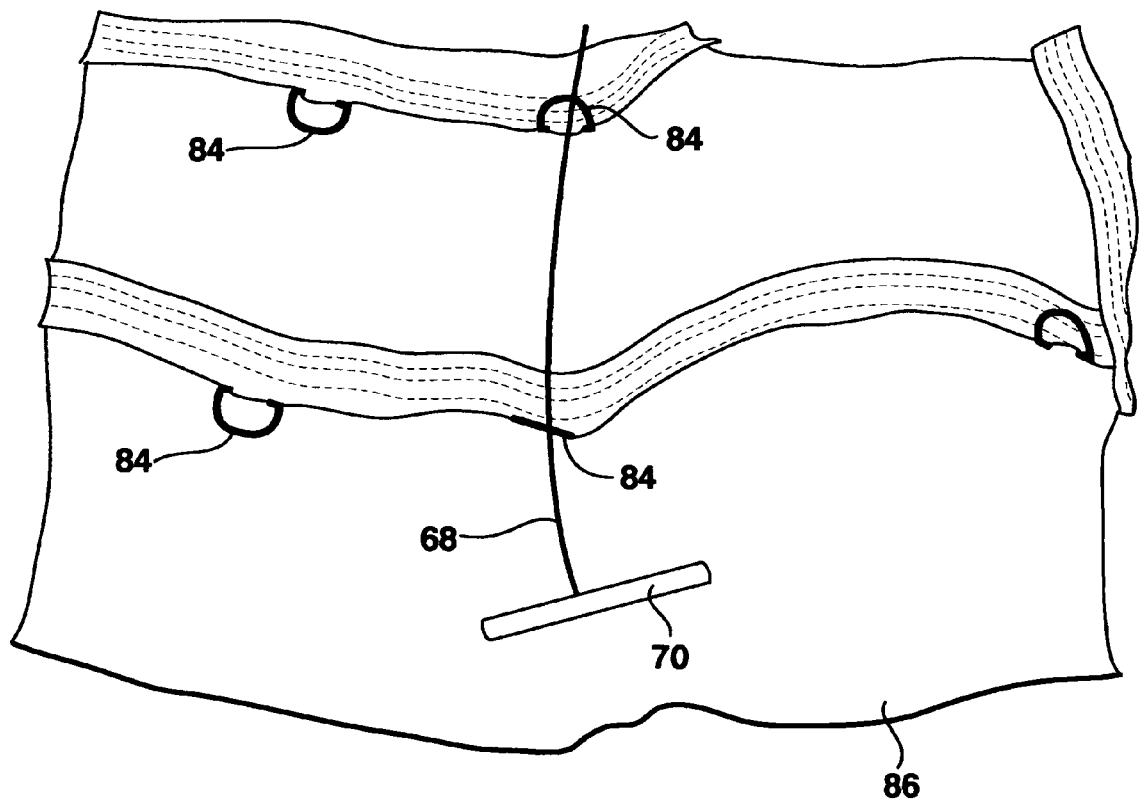
FIG. 6A is a detail perspective view of a tarp connector used with the present invention mounted to a tarpaulin.
Figure 13:
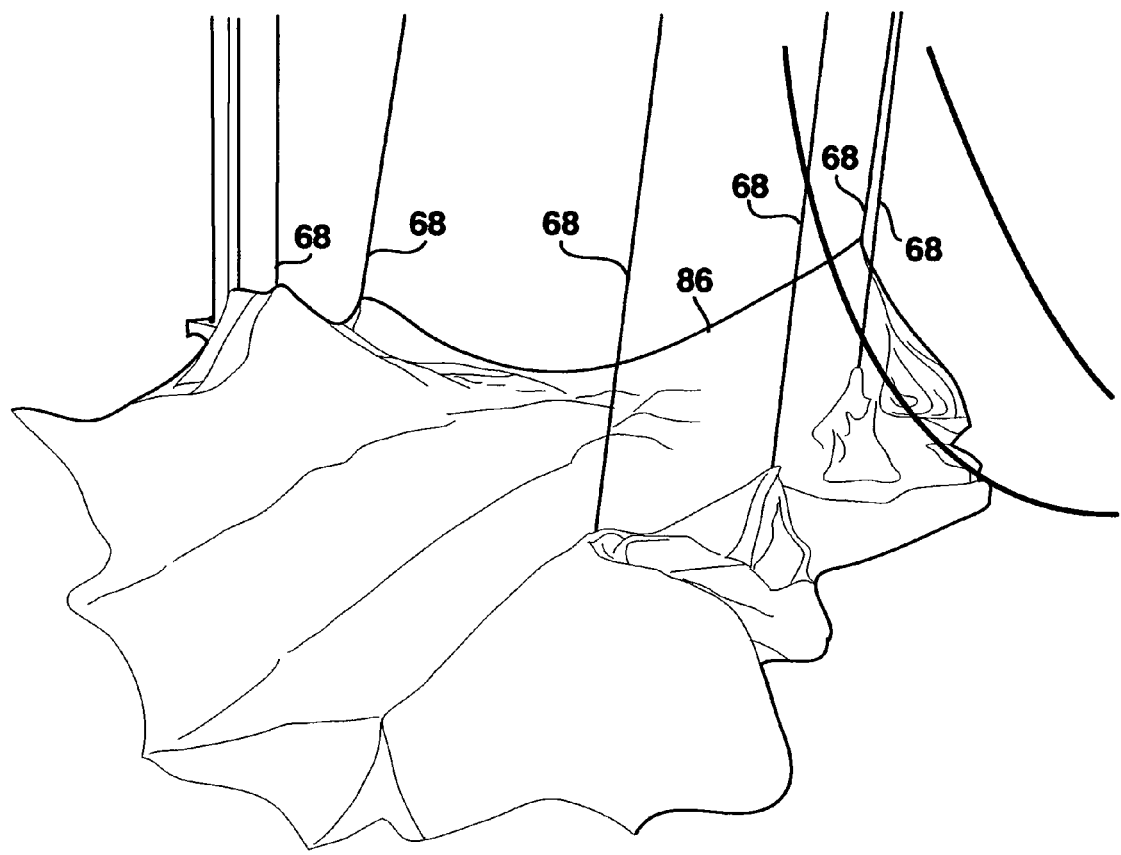
FIG. 13 is a perspective view of the lifting cables attached to a tarpaulin.

In using the tarp connector 70, the cable 68 is positioned to extend out through the end wall 81 of part 74 as shown in FIG. 11. The tarp connector 70 is then threaded through tie down "D" rings 84 conventionally provided on a tarpaulin 86 as shown in FIGS. 6 and 13. After the tarp connector 70 is threaded through the "D" rings 84, the cable 68 is moved to the position as shown in FIG. 10 and in FIG. 6A. In this position the tarp connector 70 is prevented from being drawn back through "D" rings 84 when the motor 46 is activated to wind the cable 68 onto the cable drums 66. The cables 68, under motor control, lift the tarp upwardly to a position as shown in FIG. 2.

Figure 15:
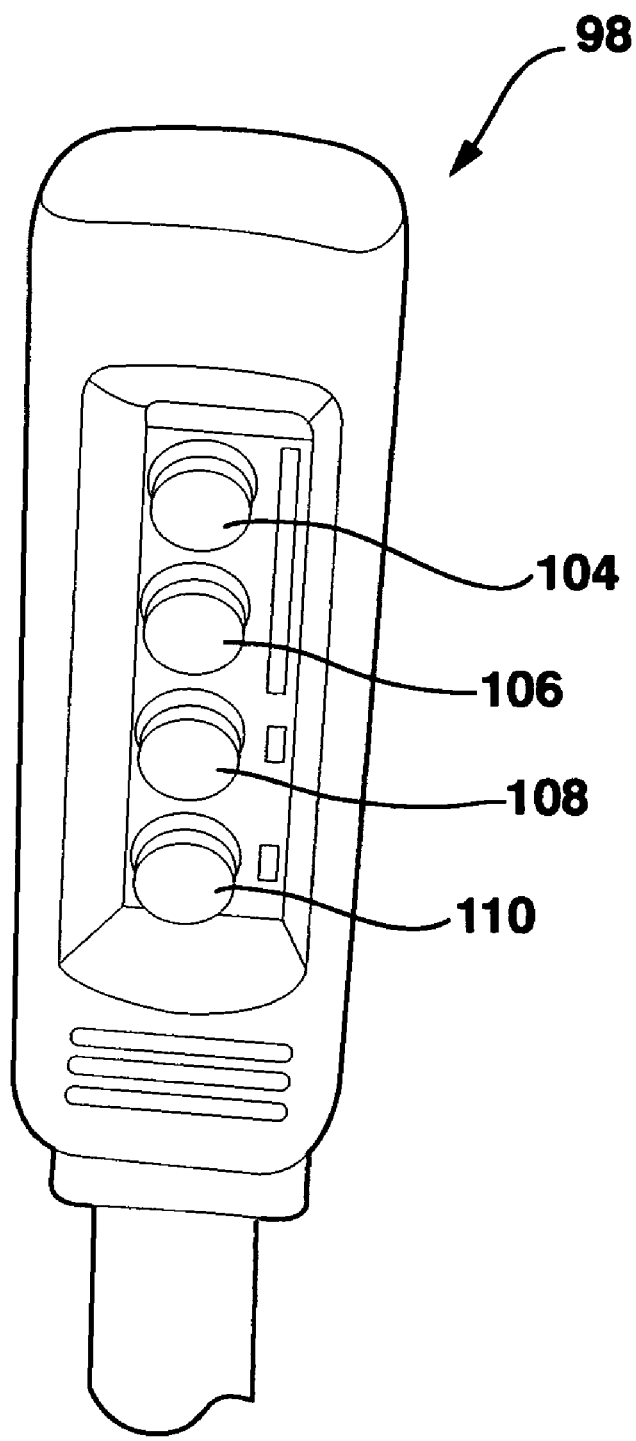
FIG. 15 is a view of an electrical switch used with the present invention.
Figure 17:
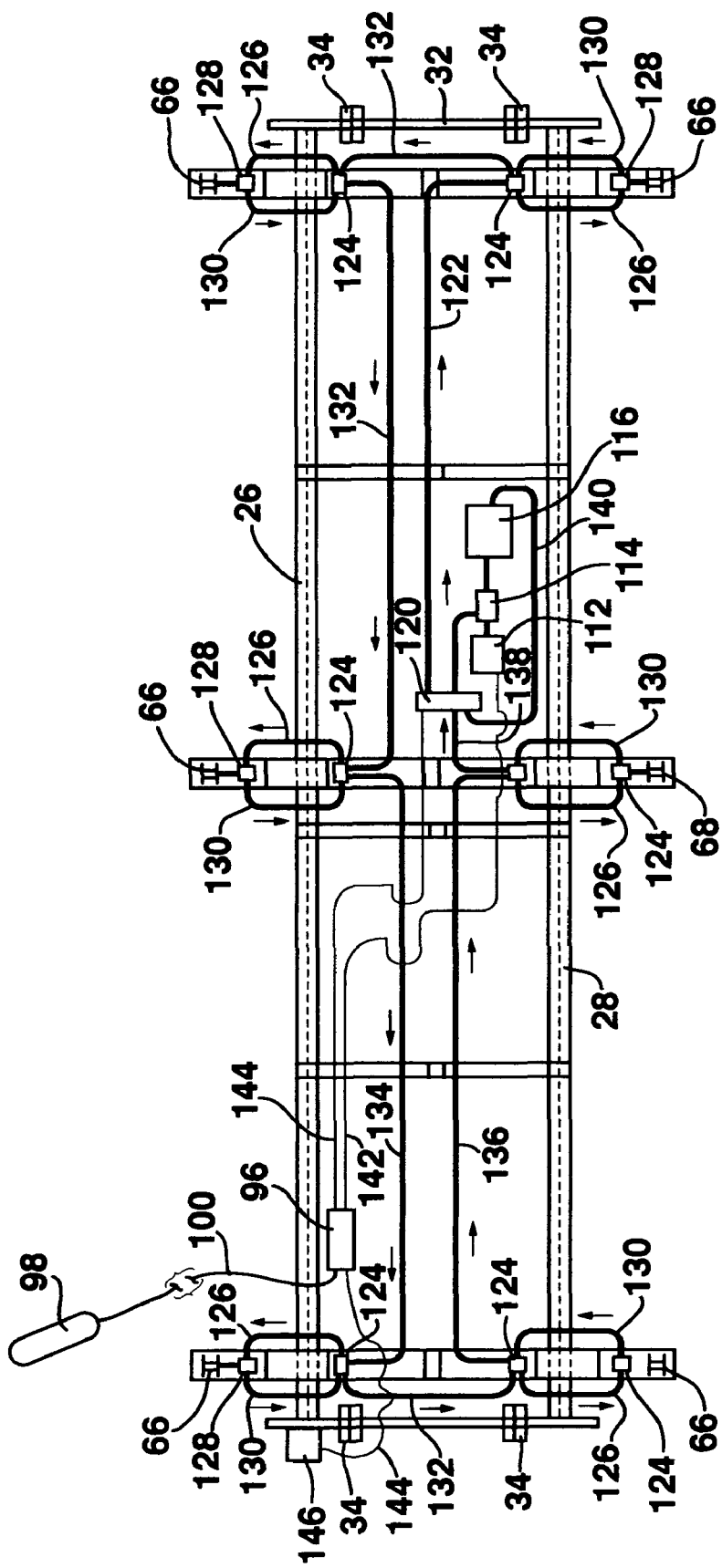
FIG. 17 is a schematic bottom view of a carriage used with the second embodiment of the present invention.
Figure 18:
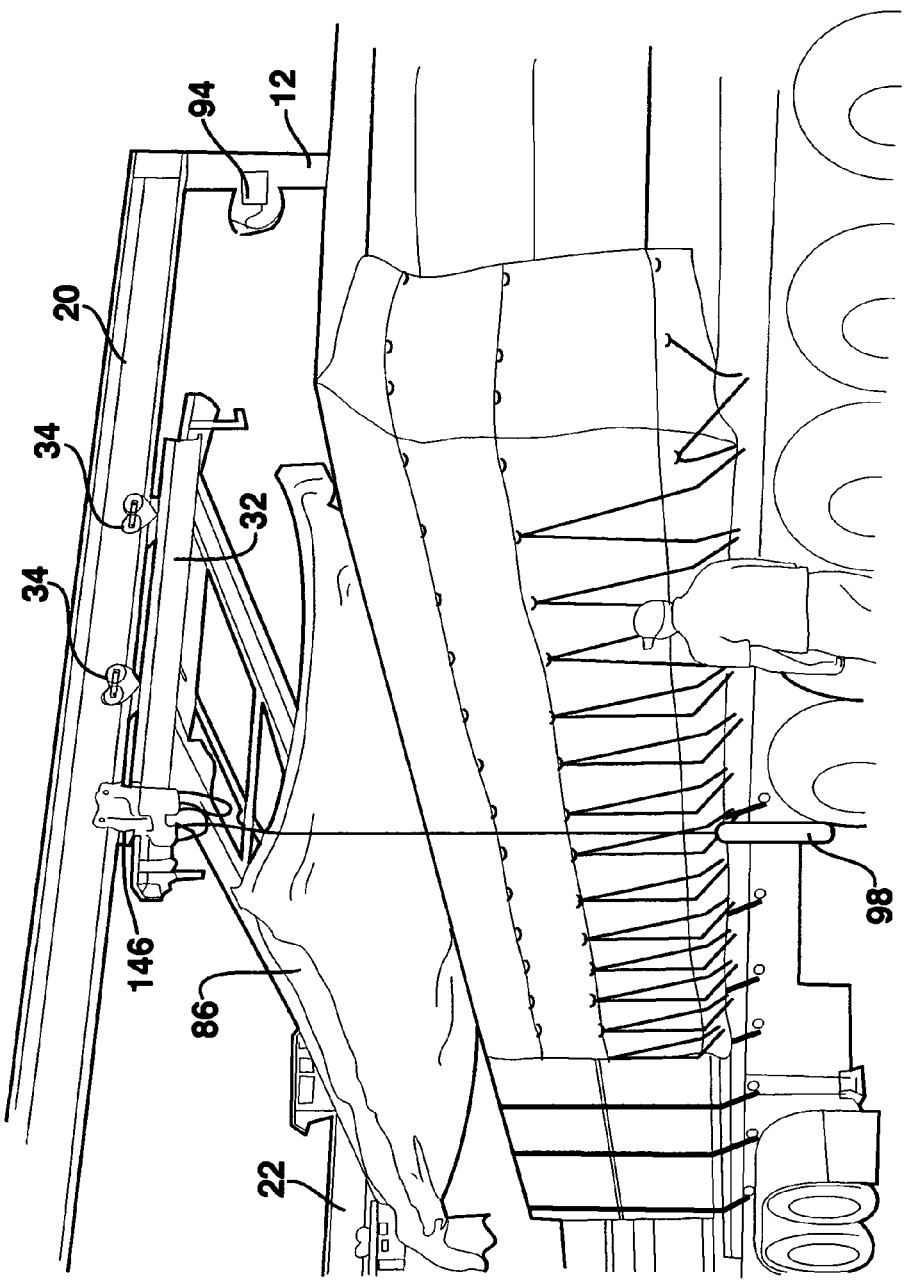
FIG. 18 is a partial perspective end view of apparatus according to a second embodiment of the present invention.
Figure 19:
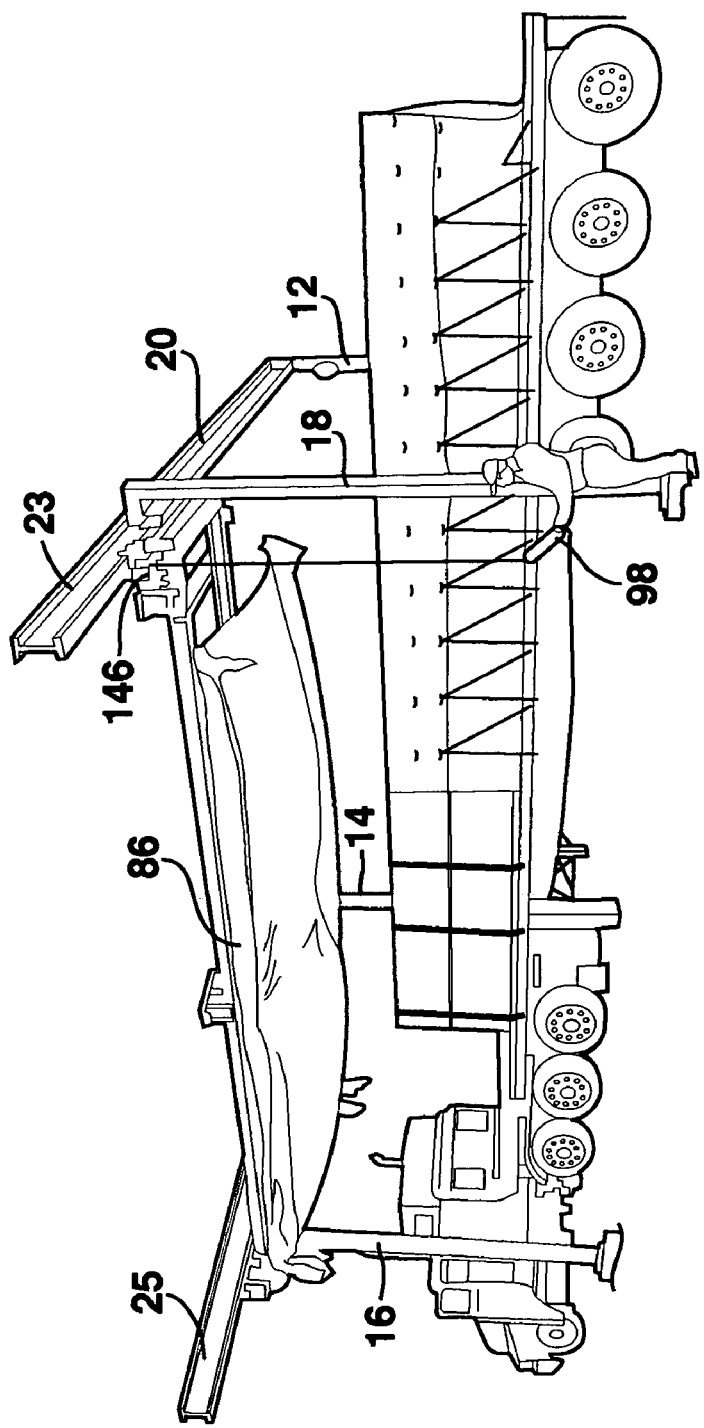
FIG. 19 is a perspective elevational view apparatus according to a second embodiment of the present invention with a semitrailer payload positioned for draping the tarpaulin over the payload.

The motor 46 is an electrical motor and is connected to a power source with an electrical cable 92 which has been releasably wound on a spring loaded cord reel 94. The electrical cable 92 is connected to an electrical junction box 96. Control switch 98 is electrically connected with a control cable 100 to the electrical junction box 96. The control switch 98 is shown in FIG. 15. The control switch 98 includes four push button switches which activate the selected motorized device as long as the switch is depressed. Push button switch 104 controls the motor 46 to raise the cables 68. Push button switch 106 controls the motor 46 to lower the cables 68. The push button switch 108 may be used to actuate a conventional tractor drive trolley 146, as shown in FIGS. 17-19, to move the carriage 24 in a forward direction. The push button switch 110 may be used to actuate the tractor drive trolley 146 to move the carriage 24 in a reverse direction.

A geared rotary limit switch 102 is mechanically connected to gear box 54 and counts the revolutions of the drive shaft 52. When the limit switch 102 reaches a preselected number of revolutions in either direction an electric signal is transmitted to the electrical control 99 to turn off the motor 46. Thus the limit switch 102 shuts off the motor 46 when the lifting cable 68 is fully wound on drum 66 or when the lifting cable 57 is fully unwound from drum 66.

Figure 14:
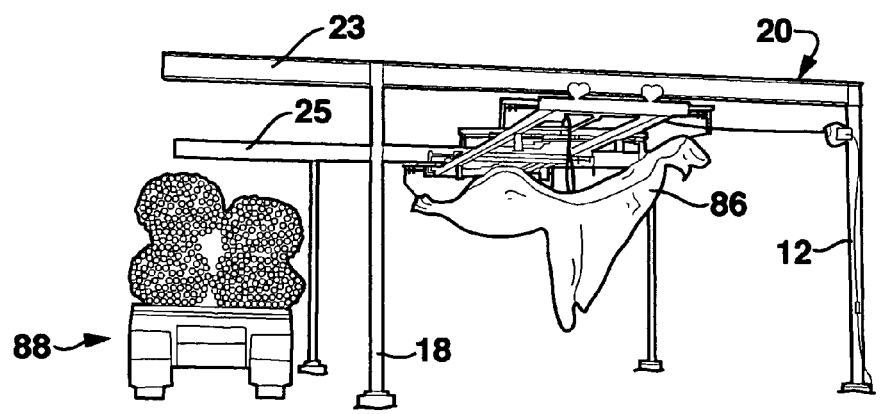
FIG. 14 is a perspective view of a semitrailer load positioned for draping the tarpaulin over the payload.
Figure 16:
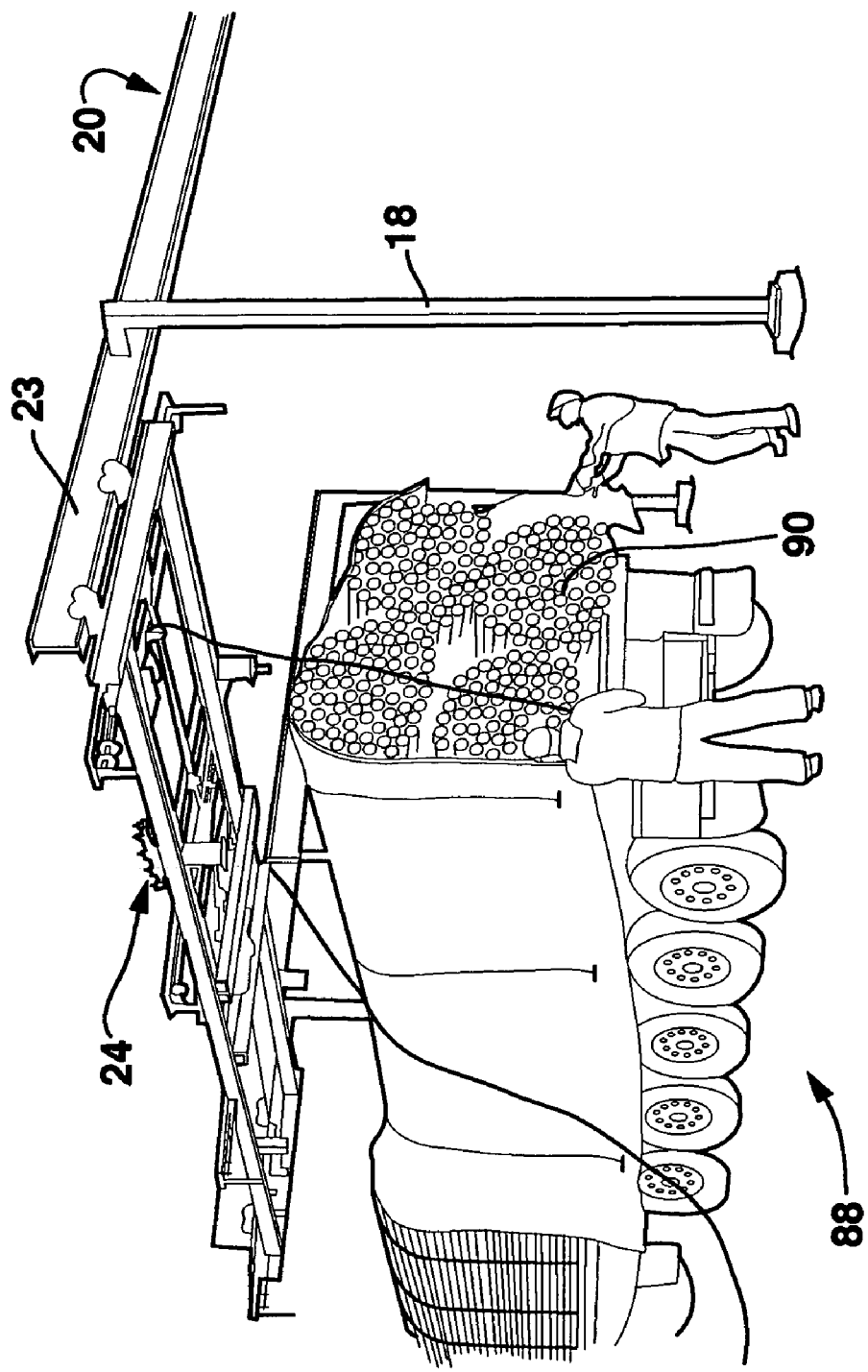
FIG. 16 is a perspective view of a semitrailer payload covered by a tarpaulin.

In using the present invention, the carriage 24 is moved, for example, to the position shown in FIG. 1. The carriage 24 may be moved manually or with a conventional tractor drive trolley 146 as shown in FIGS. 17-19. The tarpaulin 86 is positioned underneath carriage 24 as shown in FIG. 1. The control switch 98 is then used to activate the motor 46 and drop the lifting cables 68 to the tarpaulin 86. The cables 68 are then positioned in the tarp connectors 70 as shown in FIG. 11 and the tarp connectors 70 threaded through "D" rings 84. The cables 68 are then positioned in the tarp connectors 70 as shown in FIG. 10 and FIG. 6. Next the motor 46 is activated with control switch 98 to wind lifting cable 68 onto drums 66 thus lifting the tarpaulin 86 to a raised portion as shown in FIG. 2. A vehicle 88 is then driven underneath the outriggers 23 and 25 as shown in FIG. 14. The carriage 24 with the tarpaulin 86 is moved to a position over the trailer payload 90 as shown in FIG. 15. The motor 46 is then activated with switch 98 to lower the lifting cables 68 with tarpaulin 86 over the trailer payload 90 as shown in FIG. 16. The tarpaulin 86 is then secured to the vehicle 88. The lifting cables 68 are then positioned in tarp connectors 70 as shown in FIG. 11. The motor 46 is activated with switch 98 to wind the cables 68 onto drums 66 thus retracting the cables 68 from the "D" rings 84 of the tarpaulin 86. When this is completed, the vehicle 88 may be driven away with the tarpaulin 86 fully covering the payload 90.

The vehicle 88 as described above is driven underneath the outriggers 23 and 25 for draping the tarpaulin 86 over the payload 90 as shown in FIG. 16. The vehicle 88 may also be driven between the upright posts 12 and 18 and between upright posts 14 and 16 as shown in FIGS. 18 and 19. In this case, the tarpaulin 86 may be picked up by the carriage 24 when the carriage 29 is positioned below the outriggers 23 and 25.

A second embodiment of the present invention is shown in FIGS. 17-19. In this embodiment a hydraulic drive system is substituted for the electric motor and drive shaft system for rotating the drums 66. In this embodiment, an electric motor drives a hydraulic pump 114 which pumps hydraulic fluid from reservoir 116 and delivers the hydraulic fluid through line 118 to an electrically operated hydraulic control valve 120.

The solenoid valve 120 in one position is used to direct the hydraulic fluid through the system in one direction for rotating the drums 66 to allow the cable 68 to be dropped downwardly and when solenoid valve 120 is actuated to a second position it is used to direct the hydraulic fluid through the system in the opposite direction for rotating the drums in the opposite direction so as to lift the cable 68 in a manner similar to the first embodiment. The direction of fluid flow in FIG. 16 is shown with arrows to show the hydraulic fluid flowing in one direction for lifting the cables 68. When the direction of fluid flow is reversed, the hydraulic system is used for lifting the cables 68.

As shown in FIG. 16, the solenoid valve 120 is connected to a line 122 which directs fluid flow to a conventional dual direction relief valve 124. A line 126 connects the relief valve 124 with a hydraulic motor 128. The hydraulic motor then drives a first drum 66 in a conventional manner. A return line 130 returns the hydraulic fluid to relief valve 124. The hydraulic fluid is then directed through line 132 to a relief valve 124 associated with a second drum 66. The hydraulic fluid similarly is directed through line 126 to hydraulic motor 128 and then through return line 130 to relief valve 124. The hydraulic fluid is then directed through line 132 to a relief valve 124 and then through line 126 to the hydraulic motor 128 connected to a third drum 66 and then back to the relief valve 124 through line 30 and then to line 134. Line 134 is connected to a relief valve 124 which is directed as before to a hydraulic motor 128 associated with a fourth drum 66. Once the fluid is returned to the relief valve 124 the hydraulic fluid is directed through line 132 to a relief valve 124 and to a hydraulic motor 128 associated with a fifth drum 66. Hydraulic fluid when leaving the relief valve 124 is directed to a line 136 which is turn is connected to a relief valve 124. The fluid is then transported through line 126 to hydraulic motor 128 connected with a sixth drum 66 and then returned through line 130 to relief valve 124. The hydraulic fluid is then directed through line 138 back to the solenoid valve 120 and returned to the reservoir 116 through line 140.

As with the first embodiment, the hydraulic system is electrically controlled with a control switch 98 as shown in FIG. 15. The control switch 98 is connected to the junction box 96 with control cable 100. The junction box 96 is electrically connected with cable 142 to the electric motor 112. The cable 144 connects the junction box 96 with the solenoid valve 120.

A conventional electrically driven tractor drive trolley 146 is used move the carriage 24 on the travel beams 20 and 22 as shown in FIGS. 17-19. The tractor drive trolley 146 is electrically connected to the junction box 96 with a cable 148. The operation of the tractor drive trolley 146 is controlled with the control switch 98 as described above with the first embodiment.

The second embodiment is used in the same manner as the first embodiment, the only difference being that a hydraulic system is used for rotating the drums 66 instead of an electric motor 46 and drive shafts.

The present invention has particular application when multiple tarpaulins are to be used for covering a payload with the tarpaulins arranged one behind the other on top of the payload. In this situation, the truck is driven underneath the outriggers or between the upright posts and the carriage is moved to a position side by side with the payload to be covered. The cables are dropped and the tarpaulin material connected to the cables. The tarpaulin is then lifted to the overhead position and the carriage moved over the payload to be covered and the tarpaulin then dropped on top of the payload. The carriage is then retracted to the position for picking up another tarp and the truck is driven forward to an extent to allow the second tarp to be used for covering another portion of the payload. The tarp is picked up and then transported by the carriage over the top of the payload and again dropped down on top of the payload. This process can be continued until such time as the entire payload is covered.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

I claim:

1. Apparatus for covering a payload of a semitrailer with a tarpaulin cover having tie down "D" rings comprising:
    an overhead track structure including:
        a first pair of upright posts spaced apart from one another in a lateral direction of the position of the semitrailer being covered;
        a second pair of upright posts spaced apart from one another in a lateral direction of the position of the semitrailer being covered;
        the second pair of upright posts arranged in spaced apart and parallel relation with the first pair of upright posts in a longitudinal direction of the position of the semitrailer being covered;
        a first travel beam extending horizontally across the top of each of the first pair of upright posts; and
        a second travel beam extending horizontally across the top of each of the second pair of upright posts;
    an overhead carriage including a rectangular frame having spaced apart and parallel side beams and a pair of end beams each secured to opposite ends of the side beams;
    one of the end beams connected to the first travel beam and the other end beam connected to the second travel beam;
    at least four rotatable cable drums, each upon which a cable is wound, each mounted at a corner of the rectangular frame of the carriage;
    connectors for connecting free ends of the cables to "D" rings of the tarpaulin;
    a bi-directional motor connected to a power source;
    a controller electrically connected to the bi-directional motor for running the motor in either direction;
    drive shafts connecting the motor with the cable drums for rotation of the drums.

2. Apparatus for covering a payload of a semitrailer with a tarpaulin cover having tie down "D" rings comprising;
    an overhead track structure including:

a first pair of upright posts spaced apart from one another in a lateral direction of the position of the semitrailer being covered;

a second pair of upright posts spaced apart from one another in a lateral direction of the position of the semitrailer being covered;

the second pair of upright posts arranged in spaced apart and parallel relation with the first pair of upright posts in a longitudinal direction of the position of the semitrailer being covered;

a first travel beam extending horizontally across the top of each of the first pair of upright posts;

a second travel beam extending horizontally across the top of each of the second pair of upright posts;

an overhead carriage including a rectangular frame having spaced apart and parallel side beams and a pair of end beams each secured to opposite ends of the side beams;

one of the end beams connected to the first travel beam and the other end beam connected to the second travel beam;

at least four rotatable cable drums, each upon which a cable is wound, each mounted at a corner of the rectangular frame of the carriage;

connectors for connecting free ends of the cables to "D" rings of the tarpaulin;

an electric motor;

a reservoir of hydraulic fluid;

a hydraulic pump driven by the electric motor for pumping hydraulic fluid from the reservoir;

a solenoid valve fluidly connected to the hydraulic pump;

a hydraulic motor secured to each rotatable cable drum for rotating the cable drum;

a hydraulic line fluidly connecting the hydraulic pump with each of the hydraulic motors;

a return hydraulic line fluidly connecting the hydraulic motors with the reservoir; and an electric controller for actuating the electric motor and for actuating the solenoid valve to selectively deliver the hydraulic fluid received from the hydraulic pump to either the hydraulic line or the return hydraulic line.

3. Apparatus for covering a payload of a semitrailer with a tarpaulin cover having tie down "D" rings comprising:

an overhead track structure including:

a first pair of upright posts spaced apart from one another in a lateral direction of the position of the semitrailer being covered;

a second pair of upright posts spaced apart from one another in a lateral direction of the position of the semitrailer being covered;

the second pair of upright posts arranged in spaced apart and parallel relation with the first pair of upright posts in a longitudinal direction of the position of the semitrailer being covered;

a first travel beam extending horizontally across the top of each of the first pair of upright posts and having an outrigger portion extending outwardly from one of the first pair of upright posts; and a second travel beam extending horizontally across the top of each of the second pair of upright posts and having an outrigger portion extending outwardly from one of the second pair of upright posts in the same direction as the outrigger portion of the first travel beam;

a carriage including a frame having spaced apart and parallel side beams and a pair of end beams each secured to opposite ends of the side beams;

a first trolley mounted to one of the end beams and a second trolley mounted to the other end beam, the trollies positioned with one trolley riding on the first travel beam and a second trolley riding on the second travel beam;

the carriage carried by the trolleys movable from a position where the carriage rests on the first and second travel beams between the first pair of upright posts and the second pair of upright posts to a position where the carriage rests on the outrigger portions of the first and second travel beams over the payload;

at least four rotatable cable drums, each upon which a cable is wound, each mounted at a corner of the frame of the carriage;

connectors for connecting free ends of the cables to "D" rings of the tarpaulin;

an electric motor;

a reservoir of hydraulic fluid;

a hydraulic pump driven by the electric motor for pumping hydraulic fluid from the reservoir;

a solenoid valve fluidly connected to the hydraulic pump;

a hydraulic motor secured to each rotatable cable drum for rotating the cable drum;

a hydraulic line fluidly connecting the hydraulic pump with each of the hydraulic motors;

a return hydraulic line fluidly connecting the hydraulic motors with the reservoir; and an electric controller for actuating the electric motor and for actuating the solenoid valve to selectively deliver the hydraulic fluid received from the hydraulic pump to either the hydraulic line or the return hydraulic line.

4. Apparatus according to claim 3 further including an electrically driven tractor drive trolley for moving the carriage on the first and second travel beams.

5. Apparatus for covering a payload of a semitrailer with a tarpaulin cover having tie down "D" rings comprising:

an overhead track structure including:

a first pair of upright posts spaced apart from one another in a lateral direction of the position of the semitrailer being covered;

a second pair of upright posts spaced apart from one another in a lateral direction of the position of the semitrailer being covered;

the second pair of upright posts arranged in spaced apart and parallel relation with the first pair of upright posts in a longitudinal direction of the position of the semitrailer being covered;

a first travel beam extending horizontally across the top of each of the first pair of upright posts and having an outrigger portion extending outwardly from one of the first pair of upright posts; and a second travel beam extending horizontally across the top of each of the second pair of upright posts and having an outrigger portion extending outwardly from one of the second pair of upright posts in the same direction as the outrigger portion of the first travel beam;

a carriage including a frame having spaced apart and parallel side beams and a pair of end beams each secured to opposite ends of the side beams;

a first trolley mounted to one of the end beams and a second trolley mounted to the other end beam, the trollies positioned with one trolley riding on the first travel beam and a second trolley riding on the second travel beam;

the carriage carried by the trolleys movable from a position where the carriage rests on the first and second travel beams between the first pair of upright posts and the second pair of upright posts to a position where the carriage rests on the outrigger portions of the first and second travel beams;

at least four rotatable cable drums, each upon which a cable is wound, each mounted at a corner of the carriage;

connectors for connecting free ends of the cables to "D" rings of the tarpaulin;

a bi-directional motor connected to a power source;

a controller electrically connected to the bi-directional motor for running the motor in either direction;

drive shafts connecting the motor with the cable drums for rotation of the drums.

6. Apparatus according to claim 5 further including an electrically driven tractor drive trolley for moving the carriage on the first and second travel beams.

7. Apparatus for covering a payload of a semitrailer with a tarpaulin cover having tie down "D" rings comprising:

an overhead track structure including a first travel beam extending horizontally in a lateral direction of the position of the semitrailer being covered and a second travel beam extending horizontally in a lateral direction of the semitrailer being covered;

the first travel beam and second travel beam spaced apart in a longitudinal direction of the semitrailer being covered;

a carriage including a rectangular frame sized to extend between the first and second travel beam;

the carriage including means for slidably connecting the carriage to the first travel beam and second travel beam;

the carriage movable on the first travel beam and second travel beam from a position where the carriage rests over the payload to be covered to a position spaced apart and in side-by-side relation with the payload to be covered;

at least four rotatable cable drums each upon which a cable is wound, each mounted at a corner of the rectangular frame of the carriage;

connectors for connecting a free end of the cable to a "D" ring of the tarpaulin; and means for selectively rotating the rotatable drums in opposite directions to raise or lower the tarpaulin.

8. The apparatus according to claim 7 wherein the means for rotating the rotatable drums includes an electric drive system.

9. The apparatus according to claim 8 where the means for rotating the rotatable drums include a hydraulic drive system.

10. The apparatus according to claim 7 further including an electric means for selectively moving the carriage from the first position to the second position in either direction.

\* \* \* \* \*